April 16, 1957 H. L. L. JESUS 2,788,967
ARRANGEMENT FOR RECEIVING AND FOLDING, BY STACKING, OF LINEN
AND OTHER MATERIAL PRESENTED IN
THE FORM OF SUPPLE SHEETS
Filed May 26, 1950 4 Sheets-Sheet 2
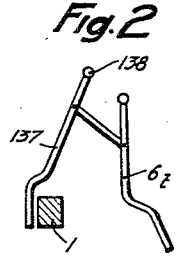
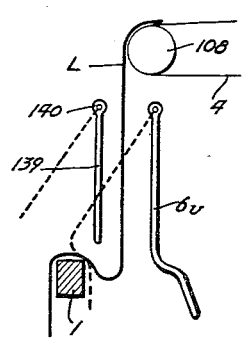
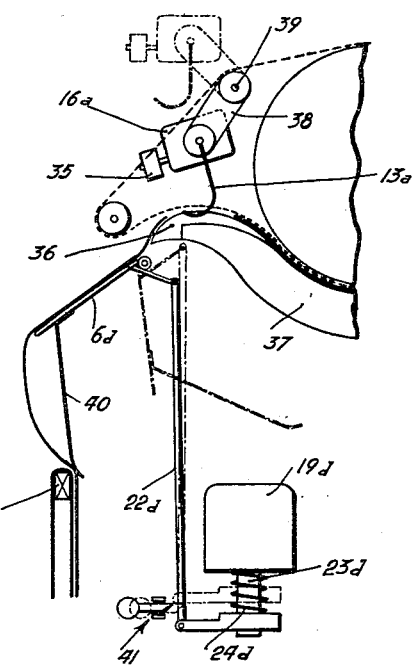
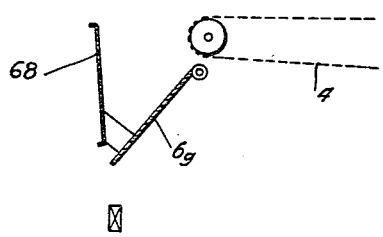
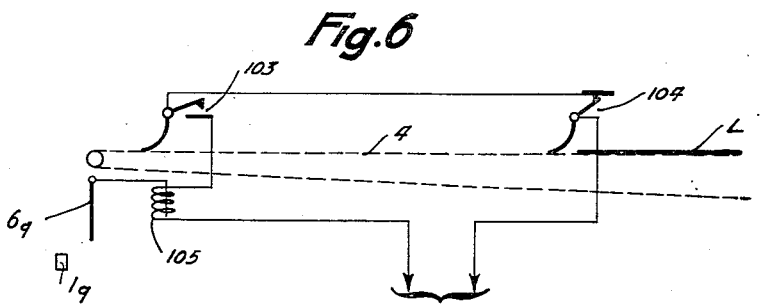
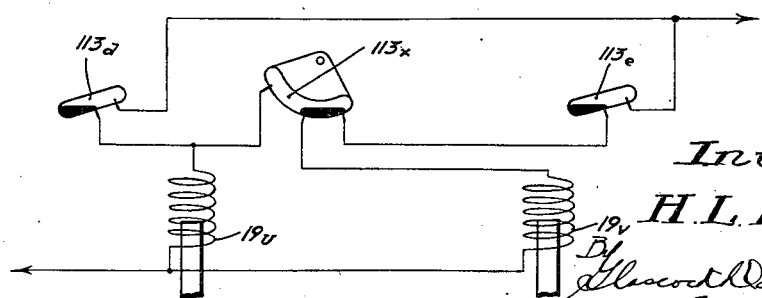
Inventor
H. L. L. Jesus Inventor
H. L. L. Jesus United States Patent Office
2,788,967
Patented Apr. 16, 1957

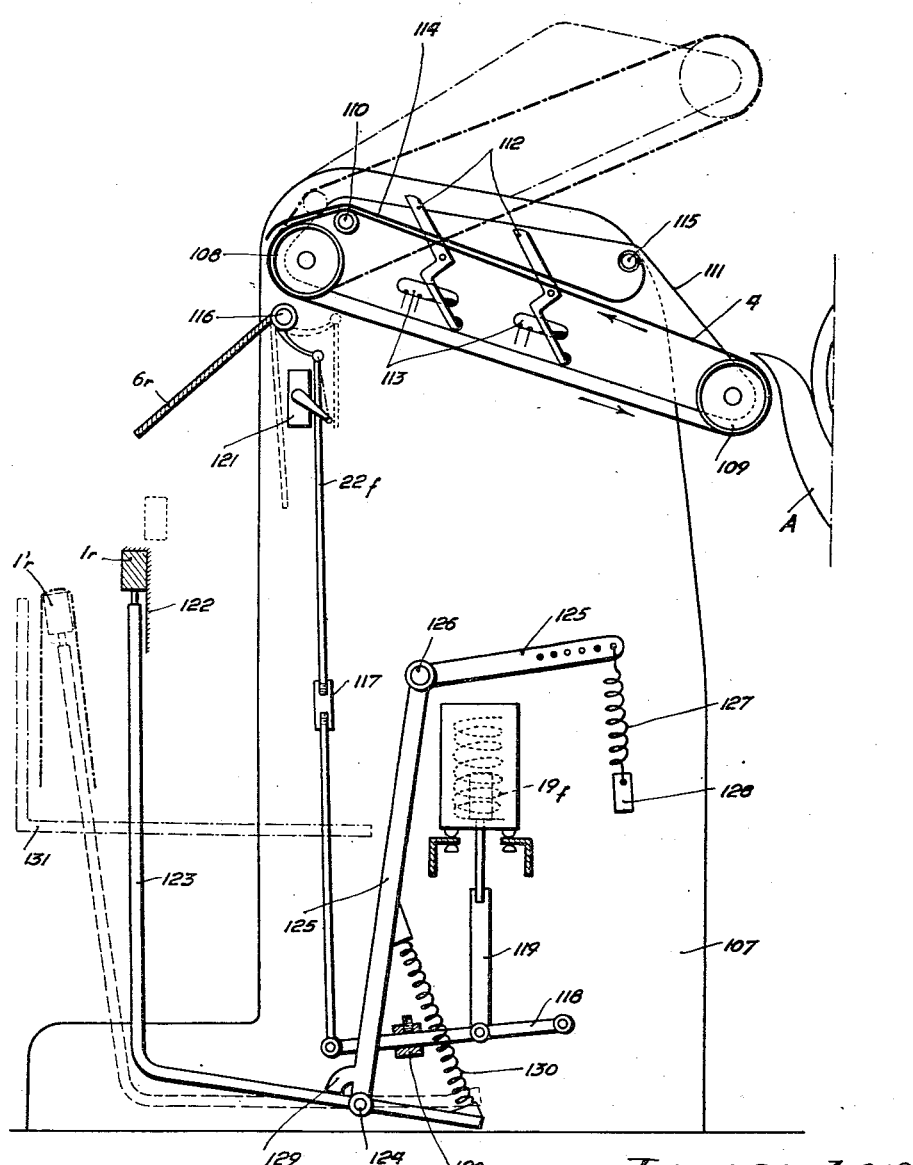

2,788,967

ARRANGEMENT FOR RECEIVING AND FOLD-
ING, BY STACKING, OF LINEN AND OTHER
MATERIAL PRESENTED IN THE FORM OF
SUPPLE SHEETS

Henri Léon Lucien Jesus, Boulogne-sur-Seine, France

Application May 26, 1950, Serial No. 164,522

Claims priority, application France May 31, 1949

4 Claims. (Cl. 270—61)

The object of my invention is to provide for an arrangement for the receiving, by stacking, of linen, more particularly of linen leaving from a drying machine or of other material having the shape of supple sheets although in what follows, in order to simplify the description, I will only speak of linen.

The main object of my invention is to provide for a receiving and folding arrangement permitting the receiving and/or the folding, by stacking, of supple sheets such as linen, naperies, kitchen clothes, bed-sheets, etc.

An object of the invention is to provide for an arrangement which automatically receives and/or folds supple sheets, such as flat linen pieces delivered from a machine such as a drying machine.

Another object of the invention is to provide for a linen receiving and/or folding arrangement which is easy to drive.

A further object of the invention is to provide for a linen receiving and/or folding arrangement which may be cheaply assembled.

As examples that are in no way restrictive the attached drawings show some of the forms that may be taken by the arrangement that is the object of my invention.

In these drawings:

Fig. 1 is a longitudinal vertical section of an improved collecting arrangement.

Figs. 2 and 3 show modifications of details therein.

Fig. 4 shows the coupling of a guard to the directing member.

Fig. 5 shows a modification as to certain elements of the arrangement.

Figs. 6 to 11 show, in six different positions, an electric control device for the directing member with a view to folding of the linen during the collecting of it.

Fig. 14 is a wiring diagram for the multiple contactors of Fig. 13.

Figure 7:
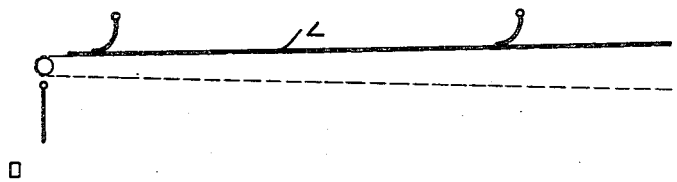
Figure 8:
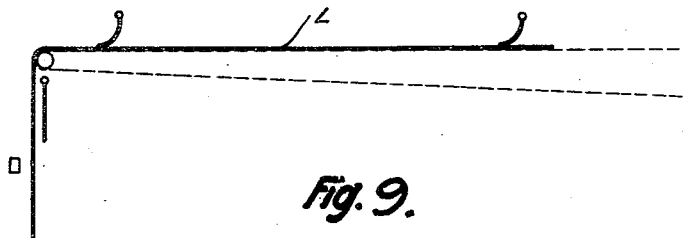

In the embodiment shown in Fig. 1, the receiving arrangement, assumed to be located at the delivery end of a dryer A, includes a frame made up of two suitably braced cheek pieces 107.

In the upper portion of the frame mentioned above, is the webbing track 4 for bringing the linen, a webbing track passing over three cylinders 108, 109 and 110 any of which is actuated by driving means not shown in the drawings. The cylinders 108, 109 and 110 are mounted in a cradle 111 that, as shown in dotted lines, may swing round the axis of the cylinder 108 and that may be made stationary in an angular position (around the axis in question) so that the cylinder 109 is at a suitable level for taking the linen pieces leaving from the nose-piece of the drying-machine A.

In the swinging cradle 111 are mounted also the feelers 112 that carry mercury contactors 113 controlling the circuit of the directing member that will be discussed later. These feelers go in the ordinary course between the webbings of the track 4, in order to be actuated by pieces of linen passing overhead.

Above the upper side of the webbing path are guiding means 114 formed by a spring harrow held on a support 115 fastened to the cradle 111, each of these springs corresponding to a webbing of which it substantially takes the shape over a certain portion of its length, more particularly above the cylinder 108. These guiding means have for aim, on the one hand, to hold the linen on the webbing path 4, that is to say to prevent it from lifting under the action of the feelers 112 (in other words to ensure the positive retracting of the feelers and the working of the contactors 113 at the time of the passing of a piece of linen) and, on the other hand, to cancel the results that might be involved with a certain stiffness of the linen, a stiffness that prevents, for instance, the falling in a vertical line of the linen flap end going beyond the nose-piece (cylinder 108) of the webbing track.

Below the cylinder 108 is the directing member formed by a screen 6r swinging at 116 and actuated from the electromagnet 19f (controlled by at least one contactor 113) by means of a rod 22f of length adjustable at 117 and of a lever 118 coupled by a link 119 to the plunger of the electromagnet mentioned above.

The adjustment of the rocking up of the screen 6r is made possible by a movable weight 120 sliding on the lever 118.

The counting of the linen pieces is obtained by a counter 121 connected to the screen 6r of which it records the pulsations.

The linen-holder 1r that is furnished with non-slipping means 122 is carried by bent supports 123 hinged at 124 to bent levers 125 of which the elbow is set to swing at 126.

The free ends of the levers 125 are each hooked in an adjustable way to one end of a tensile spring 127 of which the other end is fastened at 128. Owing to this arrangement, the linen-holder 1r may be clear progressively from the vertical plane passing through the nose of webbing track as the weight of the stacked linen increases on the linen-holder.

The normal relative angular position between the supports 123 and the levers 125 is ensured by a stop 129 and by a compression spring 130 strong enough to keep the members 123 and 125 in the position shown in the drawing, whatever may be the weight of the linen resting on the linen-holder 1r.

This arrangement allows the linen-holder to be drawn into the position 1'r when it is desired to conveniently remove the linen resting on the linen-holder.

The assembly may be finished off by a bin or receiver 131 sliding horizontally.

Fig. 2 shows a directing member 6t connected by a small rod 136 to a braking shutter 137 swinging at 138. The object of this checking shutter is to hold the linen suitably on the linen-holder 1 when the directing member 6t is in its retracted position.

In the modification shown in Fig. 3, the directing member 6u works together with the linen-holder 1 and with a directing shutter 139 that swings at 140 and has the aim of helping in the guiding of the linen L (coming from the webbing 4) in its vertical movement.

The improvement shown in Fig. 4 consists in a guard 68 fastened to the directing member 6g so that the path of the linen from the conveyor 4 goes between them both. It may be seen that the guard 68 is arranged so as to force the pieces of linen to be directed vertically downwards at the lower end of the directing member 6g, even if certain pieces of linen, for instance of starched linen, were inclined, as a result of their stiffness, not to follow the directing member 6g when the latter is in the retracted position. It goes without saying that this improvement may be used whatever may be the shape assumed by the new receiving arrangement and the way it is connected to a drying-machine.

In the modified embodiment shown in Fig. 5, a feeler member 13a is provided with a movable regulating inertia block 35. It works together with spaced bosses 36 fitted on the leaving edge of the last pan 37 of a pan drying machine. These bosses may be made to advantage of material with a high sliding coefficient and preferably rust-proof. Furthermore the swinging part of the feeler 13a and of the lagging contactor 16a is carried by an arm 38 swinging round a spindle 39 that enables this part to lift up into the position shown in dotted lines, a position in which the feeler 13a is no longer in contact with the bosses 36. There is in addition, fastened to the directing member 6d, an elastic part 40 in the shape of a flexible blade or of several spaced blades (similar for instance to the stays of a corset), so that when the directing member is in the position shown in full lines in Fig. 5, this elastic part 40 presses lightly on the linen resting on the linen-holder 1b so as to stop any sliding. Moreover, provision has been made of a device 41 for making the directing member 6d stationary in its retracted position, a device consisting of a single sliding finger capable of being located below the rod 22d, thus clamping this latter against any movement. Use is made of this clamping device when it is not desired to receive the linen on the linen-holder 1b but to let it come down vertically from the outlet end of the drying machine 37.

By a slight change to the new receiving arrangement, folding of linen pieces may be carried out in four or more. All that has to be done for this purpose is to control in a suitable way the relative movement of the linen-holder in regard to each piece that it has to take.

In Figs. 6 to 11 is shown a receiving arrangement provided with a directing part 6q that performs, in regard to a fixed linen-holder 1q, a swinging movement intended to cause the folding into four of a piece of linen L. This movement is advantageously controlled electrically from a system of switches 103—104 carried by feelers actuated by the piece of linen itself passing over the webbing track 4.

The two switches mentioned above, arranged one behind the other, are in series in the control circuit of an electromagnet 105 of which the plunger actuates the directing member 6q, the fitting being such that the switch 103 is opened and the switch 104 closed when there is no piece of linen to actuate their respective feelers (Fig. 6), and vice versa, at the time of the passing of a piece of linen.

Figure 9:
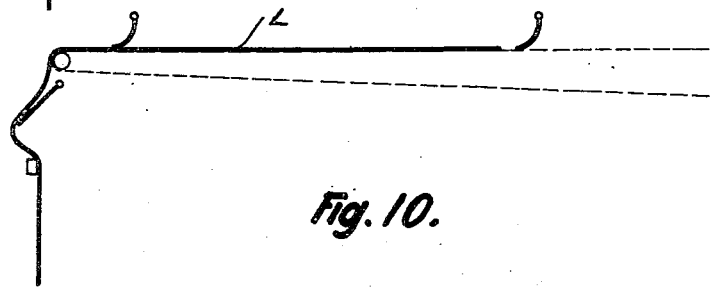
Figure 10:
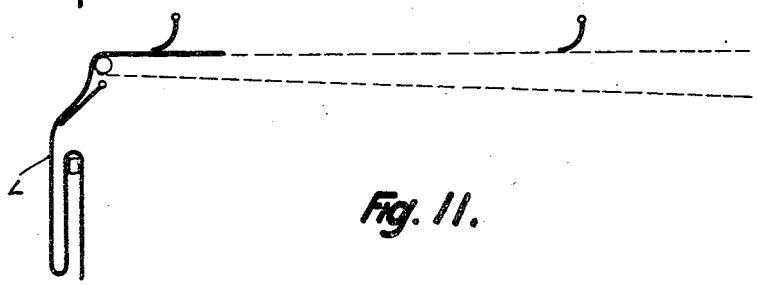
Figure 11:
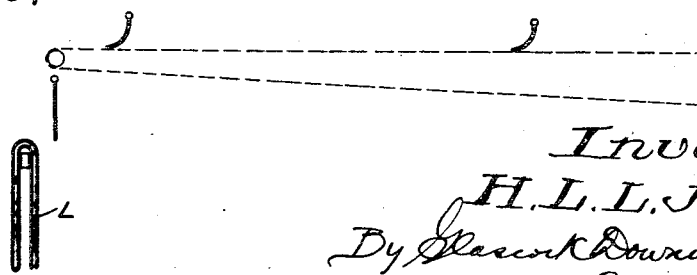

When the piece of linen brought by the webbing track 4 passes under the switch 104, then simultaneously under the switches 103 and 104 (Figs. 7 and 8), the circuit is always opened and the front flap of the linen-piece passes to the right of the linen-holder 1q. As soon as the rear end of the linen piece passes beyond the feeler of the upflow switch 104, the circuit closes and the directing member 6q causes the linen to pass to the left of the linen-holder 1q (Figs. 9 and 10). As soon as the linen leaves the downflow switch 103 the circuit opens again and the directing member returns to rest and allows the rear flap end of the linen piece to pass to the right of the linen-holder 1q (Fig. 11). The linen is thus folded into four on the linen-holder 1q.

The switch on the upflow side 104 may be of delayed closing type which enables the following linen piece to arrive before the folding cycle of the previous linen piece is stopped.

Figure 12:
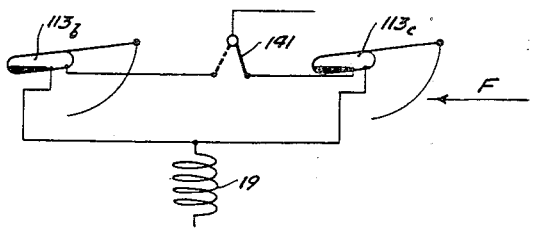
Fig. 12 is a diagram of the connections between two contactors one arranged after the other in the direction of travel of the linen.

In Fig. 12 the wiring of two contactors or linen-sensing switches 113b and 113c is shown; each contactor may be taken to represent a row of similar contactors aligned cross-wise of the conveyor direction F. Each contactor (or row) controls an electromagnet 19 which in turn actuates the linen directing member or members already described. A manual switch 141 permits the operator to select which of the contactors will be actuated in any particular case, in accordance with the lengths of the linen pieces being handled, and the instant of actuation of the magnet 19 will thus depend upon the position of the switch 141 selected in accordance with the pieces being handled.

When the linen receiving arrangement is provided with several directing elements located side by side and each controlled by one or more contactors, the directing elements having a width corresponding to the smallest size of linen piece intended to be handled, it is advantageous to obtain automatic synchronous working of two or more successively adjacent directing elements so that pieces of greater size can be received.

Figure 13:
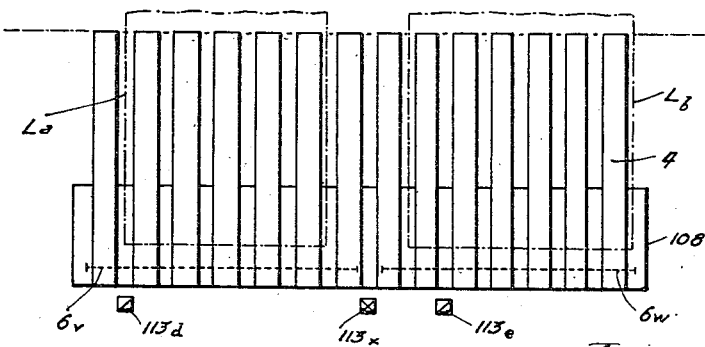
Fig. 13 is a plan view of the discharge end of the delivery apparatus using multiple lane control for separate pieces traveling in a side-by-side manner, with separate contactors and auxiliary contactors.

Such an arrangement is indicated schematically in Figs. 13 and 14. In Fig. 13, two linen pieces of small size, La and Lb, are shown passing over the webbing 4 beneath which is shown the downflow cylinder 108 under which are two independent directing elements 6v and 6w located side by side. Each directing element is controlled from a separate contactor 113d and 113e respectively, and an auxiliary contactor 113x is arranged approximately in the gap between the two pieces of linen.

Fig. 14 shows the wiring of such a system, the contactor 113d is in series with the electromagnet 19u of the directing element 6v and with an end contact of the contactor 113x whose central contact is connected to the electromagnet 19v of the directing element 6w, while the other end contact of 113x is in series with the contactor 113d.

As long as the pieces of linen La and Lb are of the width shown in Fig. 13, their passage causes the individual actuation of the contactors 113d and 113e, and consequently, the individual control of the directing elements 6v and 6w. At such times, the contactor 113x will be at rest in the Fig. 14 position. When a piece of linen of larger size arrives, although so placed as not to be able to operate contactors 113d and 113e, this piece of linen causes the swinging of contactor 113x so that both electromagnets 19u and 19v are operated simultaneously, and their corresponding directing elements operate in unison so that both operate to dispose the larger piece of linen in the manner described above.

What I claim is:

1. An arrangement for the receiving and the folding by stacking, of pieces of linen and other pieces having the form of flexible sheets, comprising: a frame; movable conveying means mounted on said frame and having a delivery end, for positively carrying the pieces to be received and adapted for vertical hanging of the delivered pieces at said delivery end; at least one detecting means sensitive to the passing of the pieces in the conveying means; pivoting directing means located near the delivery end of the movable conveying means for changing the path of the pieces delivered by the conveying means and hanging at the delivery end thereof; at least one control means connected to the detecting means and operatively connected to the directing means so that the latter pivot, in timed relation to the passing of the pieces, under the action of the positive conveying of the pieces by the holding means; a movable piece holder located underneath the path of the lower edge of the directing means and mounted upon an offset pivot for receiving, in an astride position, the pieces coming from the conveying means and guided by said directing means; and yielding supporting means adapted for yieldingly carrying the piece holder so that the latter progressively moves itself, downwardly and laterally, as a function of the increasing weight of the pieces stacked thereon, in order to keep substantially invariable, on the one hand, the space between the upper part of the stacked pieces and the path of the lower end of the directing means and, on the other hand, the space between the rear flap of the stacked pieces and a vertical plane containing the delivery end of the conveying means.

2. An arrangement as claimed in claim 1, wherein the yielding supporting means comprise at least one lever pivoted to the frame about an axis located to one side of a vertical plane containing the piece holder and to which is secured the piece holder, and at least one spring connected to said lever for urging the piece holder into a raised position and allowing said piece holder to progressively lower and to move aside from the vertical plane containing the delivery end of the conveying means, as a function of the increasing weight of the pieces progressively stacked thereon.

3. In an arrangement for the receiving and the folding, by stacking, of pieces of linen and other pieces having the form of flexible sheets, comprising: a frame; movable conveying means having a delivery end, mounted thereon for positively carrying the pieces to be received and adapted for the vertical hanging of the delivered pieces at said delivery end and for preventing the hanging pieces from falling freely under the action of their weight; detecting means sensitive to the passing of the pieces carried by the conveying means; pivoting directing means located below the delivery end of conveying means for changing the path of the pieces delivered by said conveying means and hanging at the delivery end thereof; at least one control means operatively connected to the directing means for actuating the latter and connected to the detecting means, so that said directing means pivot, in timed relation to the delivery of the pieces, under the action of the passing of the pieces; and a movable piece holder located underneath the path of the lower edge of the directing means for receiving, in an astride position, the pieces coming from the conveying means and guided by said directing means, said piece holder being so arranged as to move in response to increased weight of the pieces thereon in a path having a horizontal component, in order to maintain substantially constant the distance between a vertical plane in which the pieces delivered by the conveying means are hanging and the rear part of of the pieces astride the piece holder, progressively with their stacking on said piece holder.

4. An arrangement as claimed in claim 3, including a support pivoted on the frame and wherein the piece holder is mounted on said support, the pivot of said support being so located that the piece holder moves, in a given path, in order to depart from the vertical hanging plane of the delivered pieces, as the piece holder is pushed down by the weight of the pieces being stacked.

References Cited in the file of this patent

UNITED STATES PATENTS

| | | |
|---|---|---|
| 1,519,733 | Kohn | Dec. 16, 1924 |
| 1,624,060 | Nanterne | Apr. 12, 1927 |
| 1,766,789 | Mayer | June 24, 1930 |
| 1,986,305 | Tropp | Jan. 1, 1935 |
| 2,072,937 | Beattie | Mar. 9, 1937 |
| 2,124,858 | Marchand | July 26, 1938 |
| 2,181,995 | Keil | Dec. 5, 1939 |
| 2,330,903 | McDearmid | Oct. 5, 1943 |
| 2,373,532 | Bleistein | Apr. 10, 1945 |
| 2,374,779 | Preston | May 1, 1945 |
| 2,464,823 | Mallot | Mar. 22, 1949 |
| 2,477,830 | Sandberg | Aug. 2, 1949 |
| 2,482,764 | Haeberlin | Sept. 27, 1949 |

FOREIGN PATENTS

| | | |
|---|---|---|
| 513,697 | Great Britain | Oct. 19, 1939 |
| 852,898 | France | Mar. 5, 1940 |